US006957477B1

(12) United States Patent
Neiman

(10) Patent No.: US 6,957,477 B1

(45) Date of Patent: Oct. 25, 2005

(54) TOOL FOR INSTALLING NOZZLES IN POP-UP SPRINKLER HEADS

(76) Inventor: Mark Neiman, 138 Garden Dr., Kalispell, MT (US) 59901

( * ) Notice: Subject to any disclaimer, the term of this patent is extended or adjusted under 35 U.S.C. 154(b) by 20 days.

(21) Appl. No.: 10/643,356

(22) Filed: Aug. 19, 2003

(51) Int. Cl.[7] .............................................. B23P 19/04

(52) U.S. Cl. ...................................................... 29/278

(58) Field of Search .......................... 29/278, 257, 280, 29/281.1, 281.5, 282, 283, 263

(56) References Cited

U.S. PATENT DOCUMENTS

| | | | | |
|---|---|---|---|---|
| 837,577 A | * | 12/1906 | Loud | 29/257 |
| 1,408,444 A | | 3/1922 | Collins | |
| 1,962,534 A | | 6/1934 | Sweetland | |
| 2,532,141 A | | 11/1950 | Barkan et al. | |
| 3,977,063 A | | 8/1976 | Bruninga | |
| 4,085,633 A | | 4/1978 | Jackson et al. | |
| 4,151,956 A | | 5/1979 | Elliott | |
| 4,377,956 A | | 3/1983 | Cooper | |
| 4,788,894 A | | 12/1988 | Mitschele | |
| 4,866,801 A | | 9/1989 | Lamar | |
| 5,184,531 A | | 2/1993 | Wickson et al. | |
| 6,234,411 B1 | | 5/2001 | Walker et al. | |
| 6,349,624 B1 | | 2/2002 | Fahringer | |
| 6,425,564 B1 | | 7/2002 | Harnik | |
| 6,446,531 B1 | | 9/2002 | Colombani | |
| 6,487,942 B1 | | 12/2002 | Carter et al. | |

OTHER PUBLICATIONS

Rain Bird catalog online, 2003-2004.

* cited by examiner

*Primary Examiner*—Robert C. Watson

(74) *Attorney, Agent, or Firm*—Saliwanchik, Lloyd & Saliwanchik

(57) ABSTRACT

A tool for displacing the spring-biased turret from the case of a pop-up sprinkler head is described. The tool has an elongated body with a base at one end and a means to hold the sprinkler head in the body at the other end. A push-up pin or pilot sits on the base and extends toward the capture means. The pilot is inserted into the bottom of the sprinkler head at the base of the turret and the turret is pushed out of the case against the spring. The capture means holds the case with the extended turret in the tool so, for example, a nozzle can be inserted into the turret.

12 Claims, 8 Drawing Sheets

TOOL FOR INSTALLING NOZZLES IN POP-UP SPRINKLER HEADS

BACKGROUND OF THE INVENTION

Underground sprinkler systems have become increasingly popular. These systems which involve a plurality of sprinkler heads connected by pipes pop up from beneath the ground's surface to provide a property owner with a convenient and efficient way to water a lawn. Underground sprinkler systems can be operated by an automated timer/controller so the presence of an operator is not necessary to maintain a regular lawn watering schedule. Further, these systems are efficient conserving both power and water.

A common pop-up sprinkler head which is gear driven and of the rotor type has a turret within a case. The turret houses a nozzle. When the system is installed, the top of the case is near or just beneath ground level. A spring holds the turret within the case. Water pressure applied to the bottom of the turret through a water inlet at the base of the case forces the turret out of the case. When the turret pops up out of the case water flows through the turret out the nozzle to sprinkle the lawn.

Tools have been created for the periodic adjustment and maintenance of sprinkler systems that have already been installed beneath the ground. Damage to the pipes connecting the sprinkler heads require the extraction of the damaged section of pipe (U.S. Pat. Nos. 4,377,956, 5,184,531). Tools have been made to assist a technician in removing damaged sprinkler heads (U.S. Pat. Nos. 3,977,063, 4,151,956, 4,788,894, 6,349,624 B1, 6,446,531 B1). Adjustment of a system may require that nozzles be replaced within the turrets. Nozzles can become clogged and need to be replaced. Further, the selection of a specific nozzle shape dictates the direction of the spray and nozzles must be changed when fine tuning or reconfiguring a system. Since these turrets are spring-biased to remain within the sprinkler head case when no water is present. A technician must pull the turret from the case against the force of the spring. A number of tools have been devised to assist the technician in this task (U.S. Pat. Nos. 1,408,444, 1,962,534, 2,532,141, 4,085,633, 4,866,801, 6,234,411 B1, 6,425,564 B1, 6,487,942 B1, Rainbird 2003–2004 catalog). These tools require that the technician pull the turret from the case overcoming the spring and then hold the turret against the spring bias while replacing the nozzle. This is a job that requires at least two hands and requires some strength and stamina working against the powerful spring. During preparation for installation, nozzles are inserted into the turrets of the sprinkler heads. It is still necessary for a technician to pull the turret from the case and hold the turret against the spring while inserting the nozzle.

A tool which would displace the turret from the case and hold the turret outside the case while the nozzle is being inserted would allow nozzles to be placed into turrets without encumbering both hands. Further, such a tool would speed installation of the nozzles and reduce fatigue.

All patents, patent applications, provisional patent application and publications referred to or cited herein, are incorporated by reference in their entirety to the extent they are not inconsistent with the explicit teachings of the specification.

SUMMARY OF THE INVENTION

The subject invention involves as tool that is used to push the turret from the case of a pop-up sprinkler head and hold that turret outside the case while the turret is being serviced. The tool has an elongated body with a base at one end and capture means at another end. In a preferred embodiment, the body of the tool is semi-cylindrical. The semi-cylindrical body has a full base at one end and a capture means which is a crow's foot at the other end. A push-up pin or pilot is disposed on the base of the tool and extends toward the capture means. The pilot is inserted into the bottom of the case of the sprinkler head at the base of the turret and pushed into the case to displace the turret from the case. The capture means captures the top of the sprinkler head case to hold the sprinkler head in the tool. A nozzle can then be placed in the exposed turret. To remove the sprinkler head from the tool, the head is released from the capture means and the spring dispels the pin from the case.

DETAILED DESCRIPTION OF THE INVENTION

The subject invention involves a tool that pushes the turret from the case of a sprinkler head and holds that turret so, for example, a nozzle can be inserted into the turret. The tool comprises a body having a base at one end and capturing means at another end. A push-up pin or pilot is disposed on the base and extends toward the capturing means. The pilot is inserted into the bottom of the sprinkler head case at the base of the turret. As the sprinkler case is pressed down onto the pilot, the pilot pushes the turret from the case. The sprinkler head with exposed turret is held in the tool by the capture means.

Figure 2:
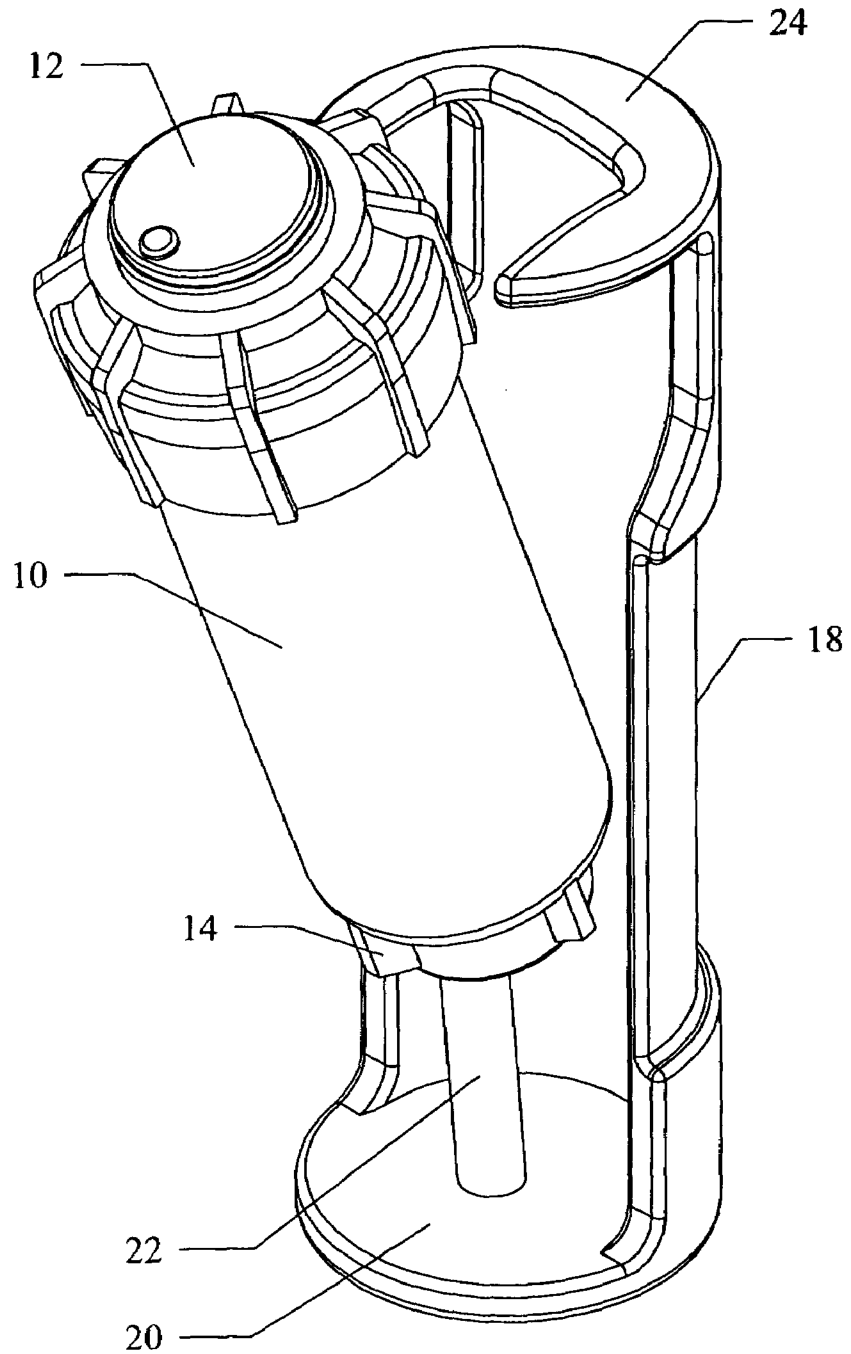
FIG. 2 is a perspective view of a sprinkler head being placed into the embodiment of the tool shown in FIG. 1.
Figure 3:
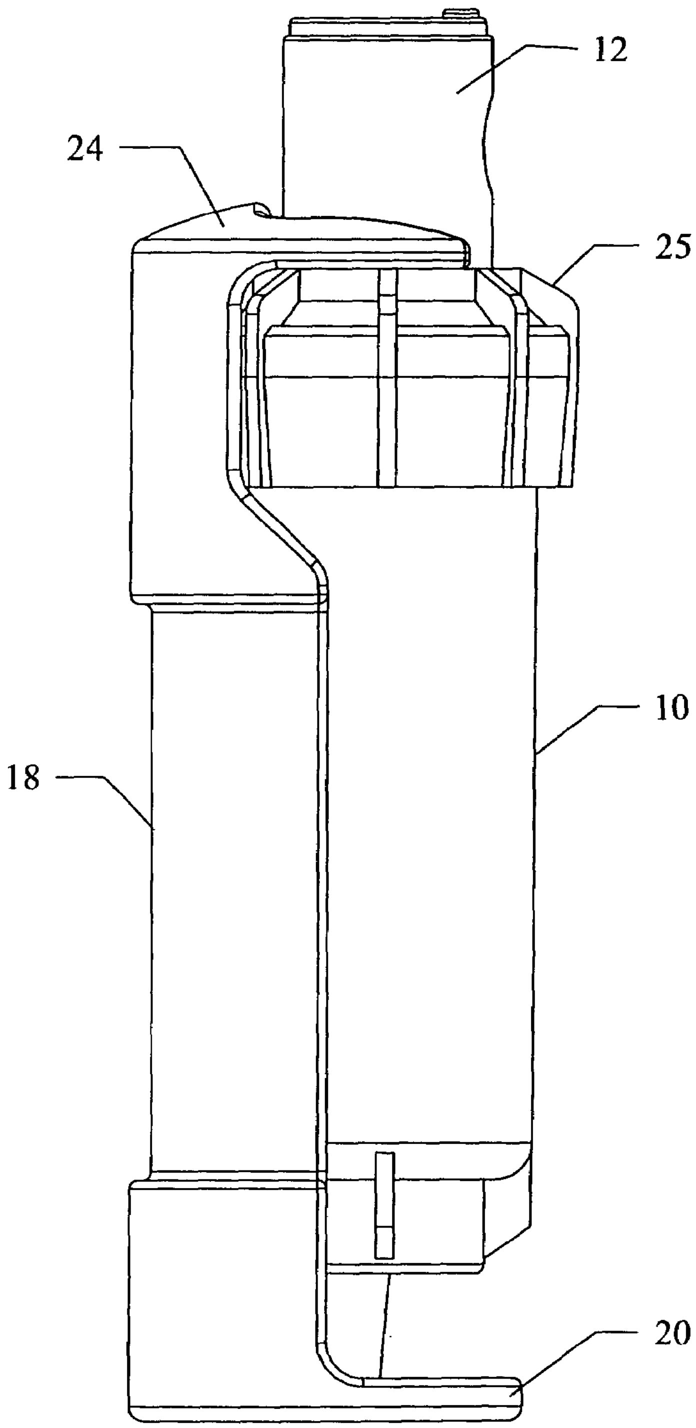
FIG. 3 is a side view of a sprinkler head in the embodiment of the tool shown in FIG. 1 where the turret has been pushed outside the case and is being held by the subject tool.
Figure 4:
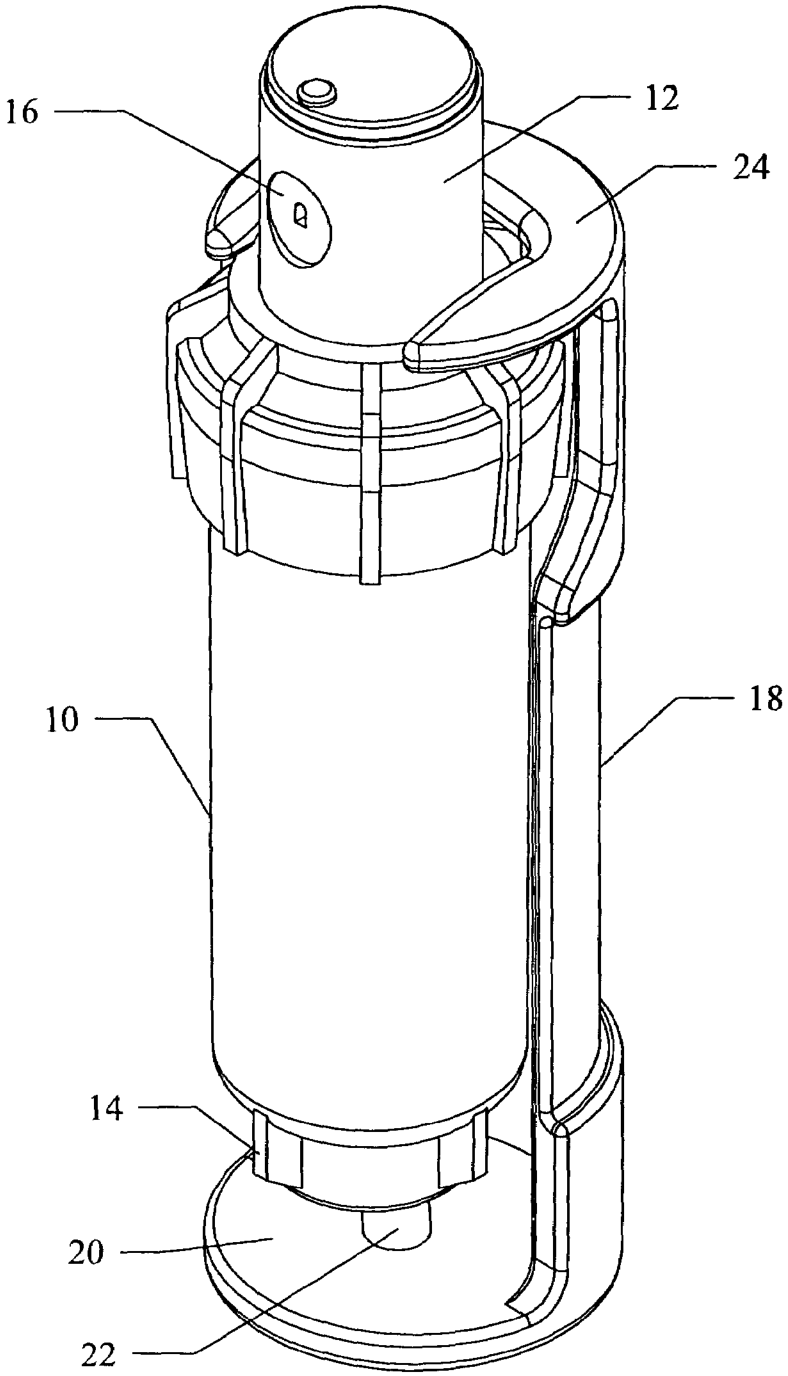
FIG. 4 is a perspective view of a sprinkler head in the embodiment of the tool shown in FIG. 1 where the turret has been pushed outside the case and is being held by the subject tool.

The tool of the subject invention is useful in displacing spring-biased turrets from the cases of pop-up sprinkler heads. This tool works only when the bottom of the case of the pop-up sprinkler head is exposed, for example, before the sprinkler head is buried in the ground. A standard rotary sprinkler head is shown associated with the subject tool in FIGS. 2–4. The sprinkler head has a case 10 in which a turret 12 rests. The turret 12 is spring-biased and held within the case. When the system is installed, the heads are connected by pipes to a water pump. Water entering the bottom 14 of the case 10 at the base of the turret pushes the turret against the spring out of the case. Water flows through the turret 12 and out of the nozzle 16 (FIG. 4). Nozzle shape determines the pattern of spray. Nozzles therefore are removable to customize a system.

The tool of the subject invention assists an installer in preparing the sprinkler heads for burial. When preparing a system for installation, an installer must repeatedly insert nozzles into a number of sprinkler heads. Currently, an installer must pull the turret from the case with one hand while holding the case with the other hand. The extended turret is then captured and held to prevent it from being drawn back into the case by the spring. The hand which originally held the case, is now used to insert the nozzle. This process requires at least two hands and can be tiring if done repeatedly working against the spring.

Figure 1:
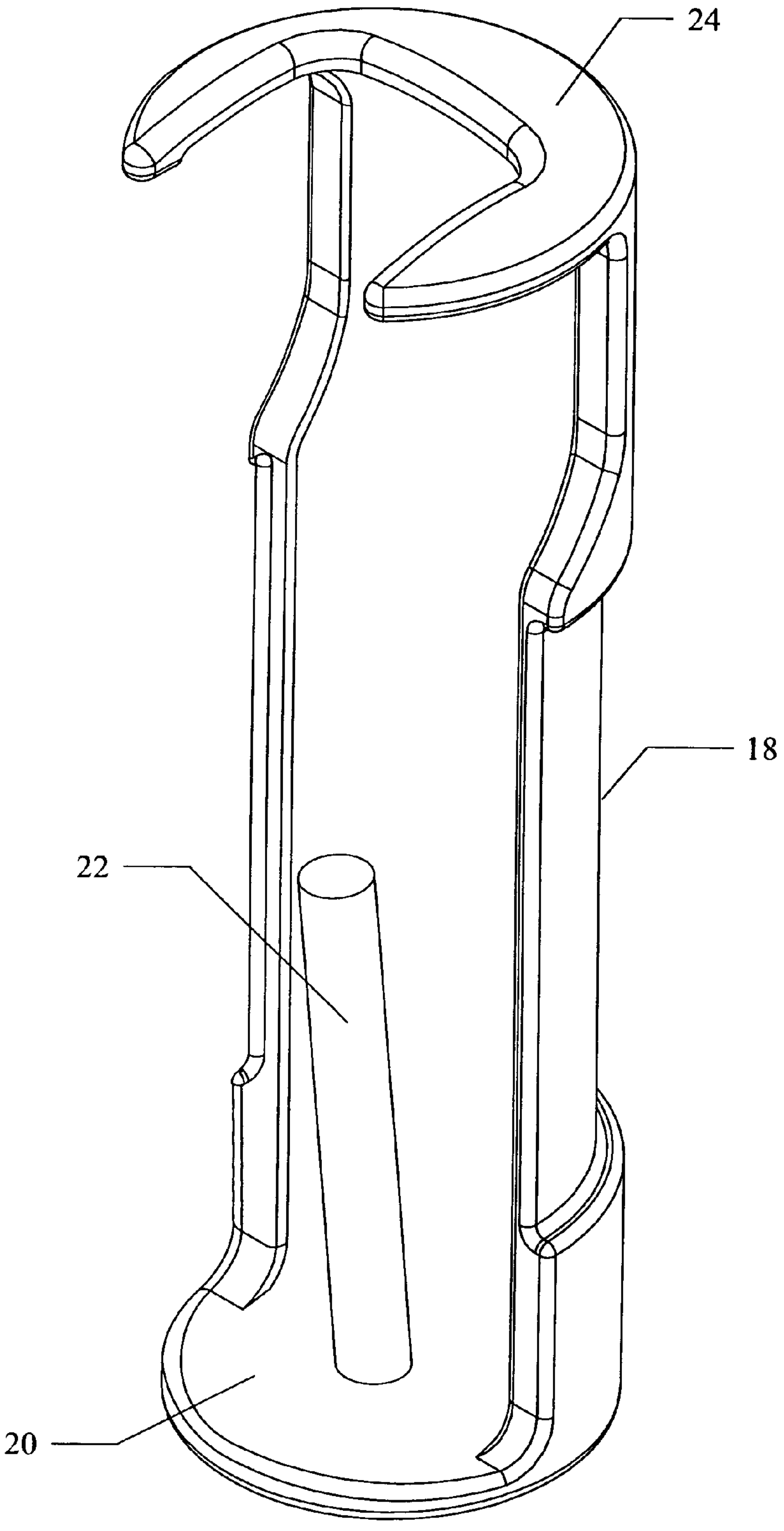
FIG. 1 is a perspective view of a preferred embodiment of the tool of the subject invention.

The tool of the subject invention pushes the turret 12 of the sprinkler head case 10 and hold the turret for nozzle insertion. The tool comprises a body 18, a base 20, a pilot 22 and capture means 24 to hold the sprinkler head case with the extended turret in the tool. A preferred embodiment of the subject tool is shown in FIG. 1.

The body 18 of the tool of the subject invention is elongated with a base 20 at one end and capture means at the other end. The body should be about the length of the sprinkler head case. The body can be any elongated shape including, but not limited to, a simple bar, or as shown in the exemplified embodiment, a semi-cylinder, or combinations thereof. For example, the body can be a bar proximate the capture means and semi-cylindrical proximate the base. The semi-cylindrical shape of the body mimics the generally cylindrical shape of the sprinkler head case.

A base 20 is at one end of the elongated body 18. The base 20 supports the pilot 22. In the exemplified embodiment, the base is circular and attached to the end of the semi-cylindrical body. The base however can be any shape, it can be a simple shelf, it is only necessary that the base be able to support the working pilot.

The pilot 22 is inserted into a water inlet (not shown) at the bottom 14 of the sprinkler head case. The pilot contacts the base of the turret and pushes, against the spring, the turret from the sprinkler head case. The base of the turret has a round screen with a protruding central nipple. In a particularly preferred embodiment, the end of the pilot distal from the base 20 has a concave indentation (not shown) to catch the nipple and direct the pilot into the case. The length of the pilot should push the turret far enough out of the case to allow access to the nozzle or other working parts of interest on the turret. In an alternate embodiment, the pilot is spring-biased so it tilts away from the body 18. This allows the pilot to be placed into the water inlet of the sprinkler head in a direct line. The case and pilot are then moved back toward the body as the pilot is inserted into the case.

Means to capture the sprinkler head case and extended turret are at the other end of the body 18. In the exemplified embodiment the capture means 24 is a crow's foot or crescent shaped cap. The cap rests against the top 25 of the sprinkler head case. In this embodiment, the crescent shape contacts the cylindrical case along about one half of its circumference. The capture means 24 can be any shape however as long as it is strong enough to hold the case in place against the spring. For example, the capture means can be a simple tab, or a collar. In the exemplified embodiment, the capture means captures the top of the sprinkler head case holding the case in the tool. Alternatively, the capture means can engage a ring on the extended turret of the sprinkler head preventing the turret from returning to the case. The ring is preformed on some models of sprinkler heads.

Figure 5:
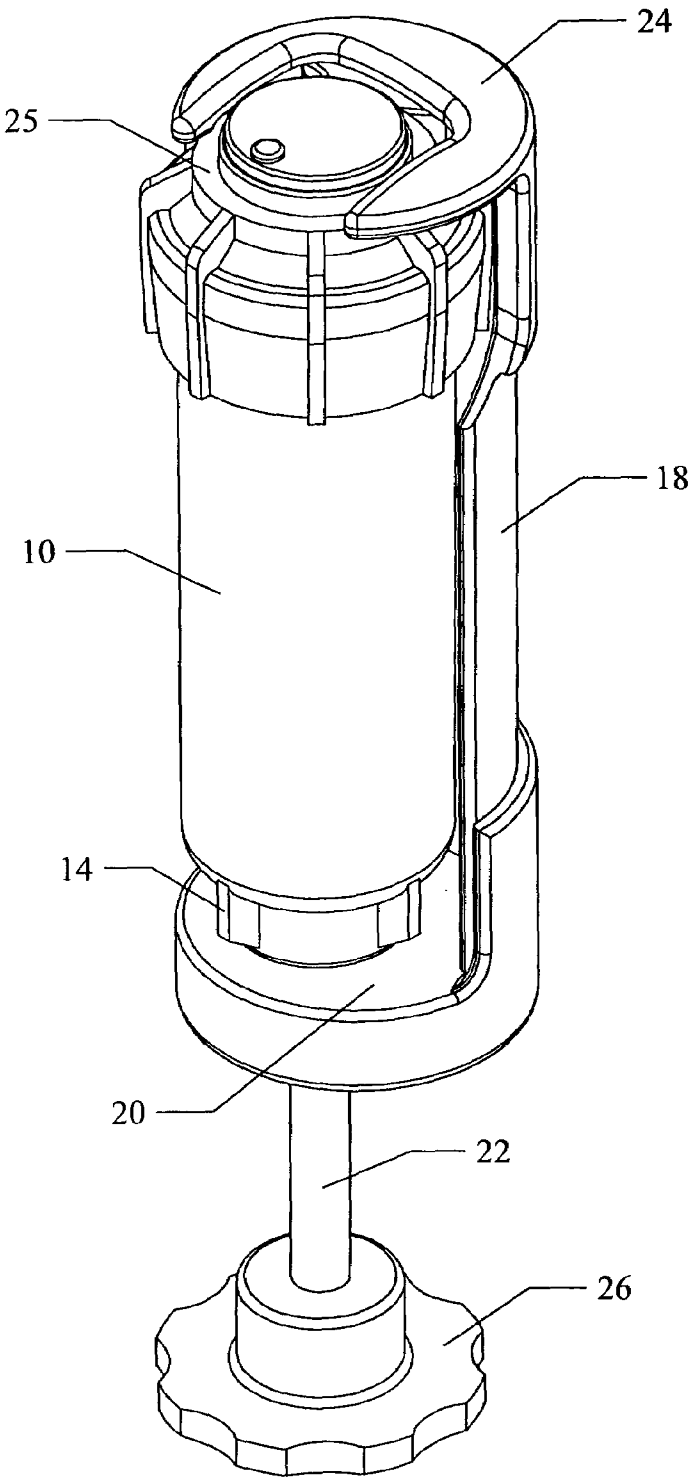
FIG. 5 is a perspective view of another preferred embodiment of the tool of the subject invention.
Figure 6:
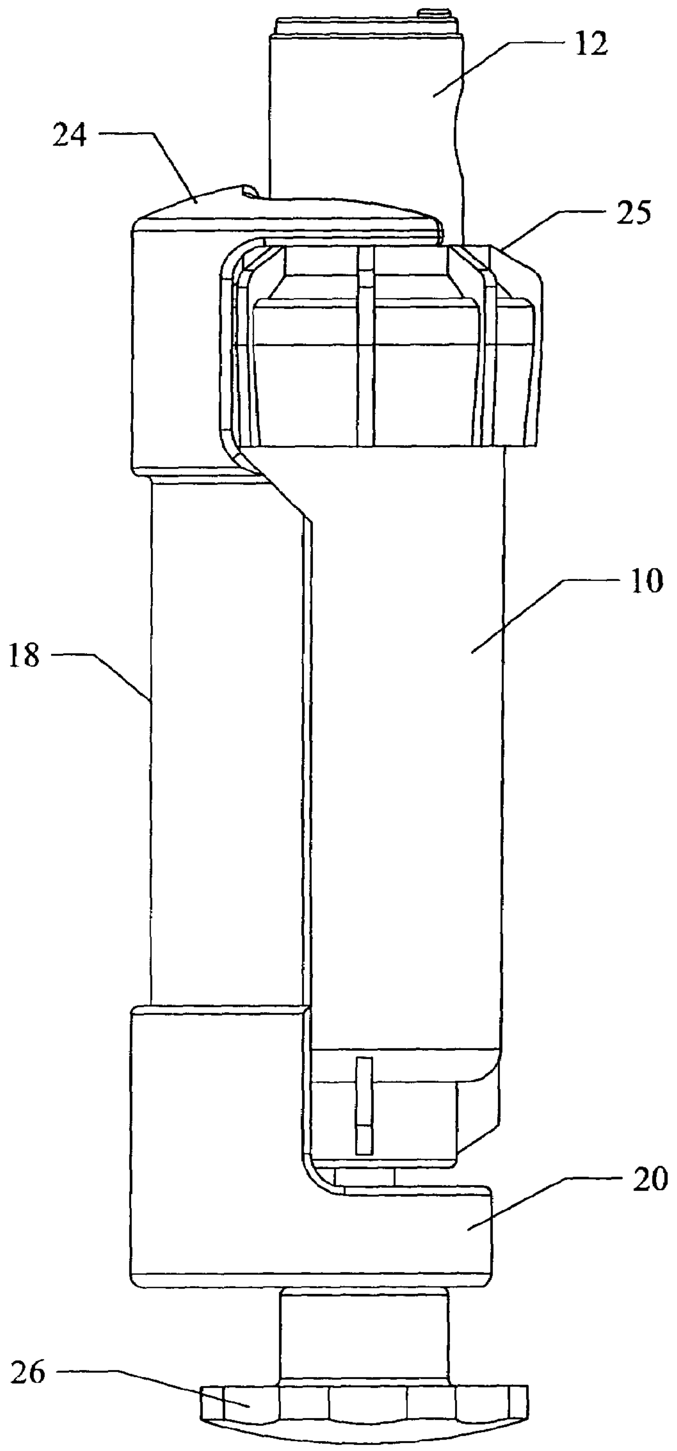
FIG. 6 is a side view of the embodiment shown in FIG. 5 where the turret has been pushed outside the case and is being held by the subject tool.

Another preferred embodiment of the tool of the subject invention is shown in FIGS. 5 and 6. In this embodiment, the pilot 22 has a knob 26 to assist in pushing the pilot into the case. The pilot can simply be pushed in and locked in place with a locking means or can be threaded and screwed into the base of the tool.

Figure 7:
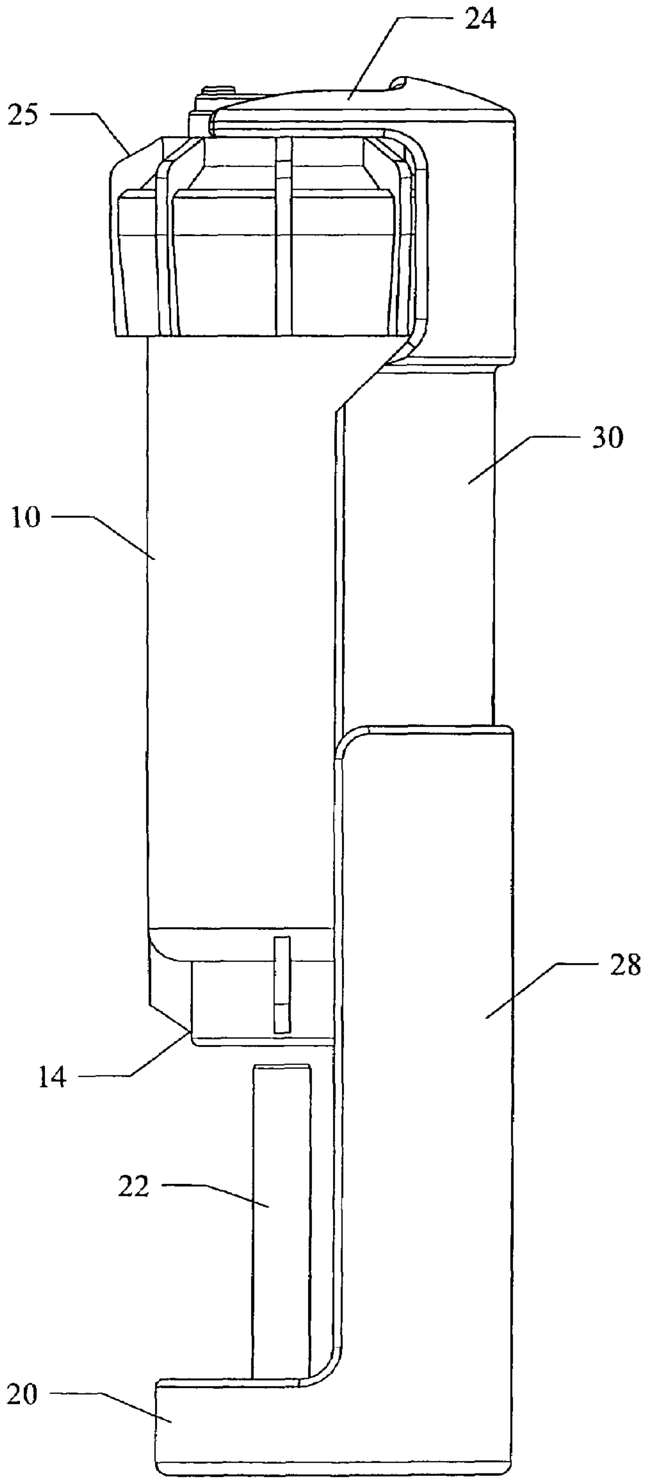
FIG. 7 is a side view of a preferred embodiment of the tool of the subject invention.
Figure 8:
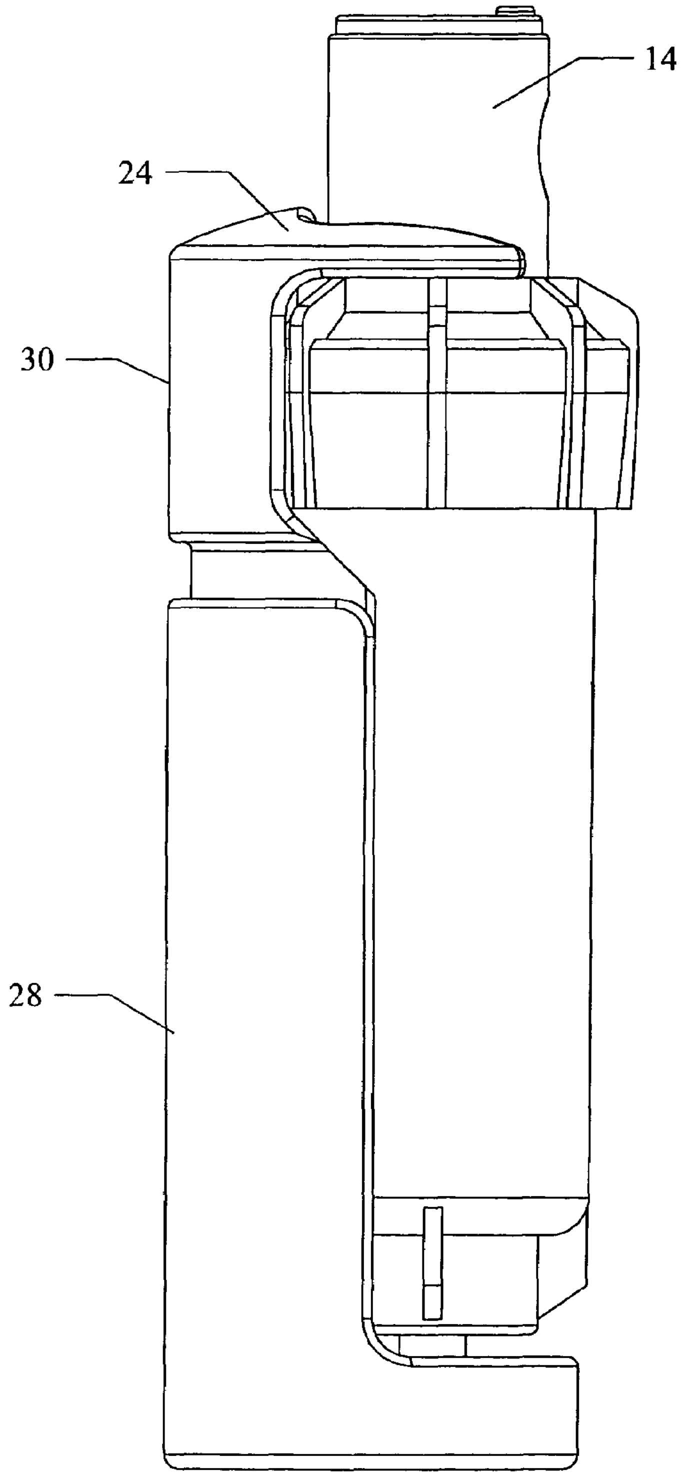
FIG. 8 is a perspective view of a sprinkler head in the embodiment of the tool shown in FIG. 7 where the turret has been pushed outside the case and is being held by the subject tool.

Another preferred embodiment of the tool of the subject invention is shown in FIGS. 7 and 8. In this embodiment, the body has two sections. A first section 28 comprises the base 20. The second section 30 telescopically engages the first section and comprises the capture means 24. The pilot 22 is pushed into the sprinkler head case 10 by sliding the second section 30 toward the first section 28. The pilot displaces the turret and the sections are locked together against the spring to hold the turret outside the case.

It is understood that the foregoing examples are merely illustrative of the present invention. Certain modifications of the apparatuses and/or methods employed may be made and still achieve the objectives of the invention. Such modifications are contemplated as within the scope of the claimed invention.

What is claimed is:

1. A tool for pushing a turret from a case of a pop-up sprinkler head, the tool comprising:

a semi-cylindrical elongated body having a length of about the length of the case of the sprinkler head comprising a base at one end and capture means at another end; and a pilot disposed on the base extending toward the capture means;

wherein the pilot is of sufficient length to displace the turret from the case of the pop-up sprinkler head and the capture means holds the case with the displaced turret along a length of the body.

2. The tool of claim 1, wherein said body is a bar.

3. The tool of claim 1, wherein said body proximate said base is a semi-cylinder and said body proximate said capture means is a bar.

4. The tool of claim 1, wherein said base is a circular disk.

5. The tool of claim 1, wherein said capture means is a crescent-shaped cap.

6. The tool of claim 1, wherein said capture means is a collar.

7. The tool of claim 1, wherein said pin is spring-biased.

8. The tool of claim 1, wherein said tool further comprises a knob to move said pilot.

9. The tool of claim 1, wherein said body comprises a first piece, the first piece comprising said base, and slidably engaged to a second piece, the second piece comprising said capture means, and wherein said pilot is pushed into said case to displace said turret by sliding the first piece and the second piece together.

10. A tool for pushing a turret from a case of a pop-up sprinkler head, the tool comprising:

an elongated semi-cylindrical body comprising a circular disk base at one end and crescent-shaped capture means at another end, wherein the body has a length about the length of the sprinkler head case; and a pilot disposed on the circular base extending toward the crescent-shaped cap capture means;

wherein the pilot is of sufficient length to displace the turret from the case of the pop-up sprinkler head and the capture means holds the case with the displaced turret along the length of the body.

11. The tool of claim 10, wherein said tool further comprises a knob to move said pilot.

12. The tool of claim 10, wherein said body comprises a first piece, the first piece comprising said base, and slidably engaged to a second piece, the second piece comprising said capture means, and wherein said pilot is pushed into said case to displace said turret by sliding the first piece and the second piece together.

* * * * *